United States Patent Office 3,772,358
Patented Nov. 13, 1973

3,772,358
SYNTHESIS OF ALIPHATIC AMINO AND/OR CARBOXY COMPOUNDS
André Lang, Billere, France, assignor to Societe Nationale des Petroles d'Aquitaine, Tour Aquitaine, Courbevoie, France
No Drawing. Filed Dec. 21, 1970, Ser. No. 100,377
Claims priority, application France, Dec. 24, 1969, 6944820
Int. Cl. C09f 7/00; C07c 99/00
U.S. Cl. 260—404                              6 Claims

ABSTRACT OF THE DISCLOSURE

Aliphatic alpha, omega-diamino, dicarboxy or amino-carboxy compounds are synthesized by reacting a nitrogen oxide with an unsaturated cyclic hydrocarbon to form a pseudo-nitrosite, isomerizing the pseudo-nitrosite into the corresponding nitroketoxime, treating the nitroketoxime with an acid, and thereafter treating the resulting product to transform it into the desired compound. The process is particularly interesting for the manufacture of aliphatic omega-amino carboxylic acids which are used in the manufacture of polyamides.

---

The present invention relates to the synthesis of aliphatic alpha, omega-amino and/or carboxy compounds. It concerns particularly aliphatic compounds carrying an amino group or a carboxyl group at each of the ends of their chain, and more particularly omega-amino carboxylic acids.

Diacids, diamines and amino acids, of which the —$NH_2$ and —COOH functions are at the chain end, have assumed very great importance because of their usefulness in the manufacture of polyamides. Thus, it is of interest to have economic processes for the production of such compounds available. However, the known methods do not fully satisfy the needs of modern industry.

The present invention provides a practical process by which it is possible to economically manufacture diacids, diamines and especially amino acids, in whch the two active functions are connected by an aliphatic chain, particularly by a chain comprising 5 to 18 carbon atoms. Hence, it is made possible by the invention to obtain, under good conditions, alpha, omega-caproic, heptanoic, caprylic, pelargonic, capric, undecanoic, lauric and other diacids, diamines and amino acids.

In general, the compounds which are applicable in the process according to the invention can be represented by the formula

Y—$CH_2$—$CH_2$—Z or

Y—$(CH_2)_n$—Z

Y and Z, similar to or different from one another, are —$NH_2$ and —COOH groups; in other words, by means of particular orientation towards the end of the conduction of the novel process, the latter may at will lead to diacids HOOC—$(CH_2)_n$—COOH, to diamines $H_2N$—$(CH_2)_{n+2}$—$NH_2$ or to omega-amino acids $H_2N$—$(CH_2)_{n+1}$—COOH. Although n can vary within wide limits, for example, from 4 to 30, the novel process is of particular interest and utility for aliphatic compounds in which the number n of carbon atoms is from 5 to 18. The aliphatic chain can, moreover, carry alkyl branches and also aryl or other branches.

The novel process according to the invention lies in the combination of 5 successive reactions, initially making use of nitrogen oxides and a cyclic hydrocarbon with one or more double bonds. This process includes preparing a 1-nitro-2-nitroso dimer of a cyclic hydrocarbon (a pseudo-nitrosite), isomerising this compound into the corresponding nitroketoxime, hydrolysing this latter compound so as to form a 2-nitro-1-cyclanone which, in turn, is hydrolysed into the corresponding omega-nitro-carboxylic acid and then hydrogenated into omega-amino acid.

According to one variant, by a modification of the conditions of hydrolysing the nitroketoxime, furoxane is produced instead of nitroketone; the hydrogenation of the furoxane leads to an alpha, omega-diamine.

In another variant of the invention, the hydrolysis conditions of the nitroketone are modified and an alpha, omega-diacide is obtained instead of the omega-amino acid; in this variant, the hydrogenation is not effected.

The first operational phase of the novel process is common to all the variants and is the preparation of the 1-nitro-2-nitroso dimer derivative of a cyclic hydrocarbon. It can be represented diagrammatically in the following manner:

(1) 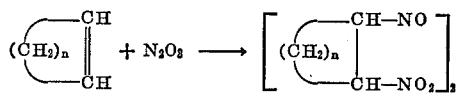

The working conditions for the preparation of pseudo-nitrosite are known per se and are particularly described in German Patent 1,236,490. The unsaturated cyclic hydrocarbon, such as cyclohexene, cyclooctene, cyclooctadiene, cyclododecene or other hydrocarbon, is dissolved in an appropriate solvent and treated with a gaseous stream containing 4 volumes of NO to 1 volume of $O_2$, at a temperature which is between —30° and +80° C., generally of the order of —10° to 0° C. However, when cyclenes with more than 8 carbon atoms are involved (particularly cyclododecene), the transformation into pseudonitrosites using the technique of the prior art does not give sufficiently good yields. This inconvenience is overcome by recovering the formed nitro-nitroso derivative before the total conversion of the cyclic olefine. It has, in fact, been established, within the scope of the present invention, that the low yield occurs when the pseudo-nitrosite is left in the reaction medium after about half of the cycloolefine has been converted.

Thus, in accordance with one preferred feature of the invention, the pseudo-nitrosite is extracted as it is formed, or at least when about 50% of the hydrocarbon has been transformed. Since the compound precipitates as soon as it is formed in the reaction medium, the recovery thereof can be effected by continuous or intermittent filtration. Another operational procedure according to the invention is to allow the nitro-nitrosation to continue until about half of the hydrocarbon being used is consumed, then stopping treatment with the nitrogen oxide, separating the formed pseudo-nitrosite and then to recycling the remaining hydrocarbon to a new nitro-nitrosation. In this way, there are obtained yields exceeding 50% with hydrocarbons such as cyclododecene or cyclododecatriene.

Another improvement according to the invention resides in the use of solvents of fairly high molecular weight, particularly paraffins and/or cyclo-paraffins, and especially such as isooctane or cyclododecane.

The second operational phase in the process according to the invention, which is the isomerisation of the nitro-nitroso compound into the corresponding nitroketoxime, is illustrated by the reaction:

(2) 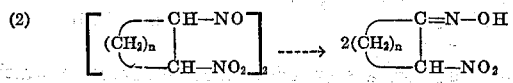

This change to the nitroketoxime is carried out in a polar solvent at a temperature in the range from 80° to 160° C., in accordance with the data given in the literature and especially in accordance with German Patent No. 1,238,461. When the initial hydrocarbon is cyclododecene, the isomerisation is conveniently carried out in dimethyl formamide at 110° C. with a yield of 80%.

The third stage of the manufacture according to the invention consists in the transformation of the nitro-ketoxime into nitroketone or into furoxane. One of two procedudres is selected, according to whether there is finally to be obtained the amino acid the diacid, or the diamine. In the first procedure, the nitroketoxime is dissolved in an appropriate solvent, particularly, in acetone; and a non-oxidising aqueous acid is added, so that the mixture has a low acidity, of the order of 0.1 N to 3 N, and preferably about 0.3 N to 1 N. For example equal volumes of an acetone solution and an aqueous solution of a normal halo-acid are mixed and heated to a temperature of 60° to 130° C. for several hours, generally 2 to 6 hours. Hydrochloric acid is particularly suitable, but other strong acids can also be used. However, an acid capable of causing a dehydrating action must not be employed.

The treatment with the halo-acid implies the reaction:

(3)

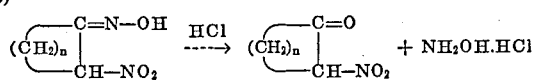

The nitroketone thus obtained is then subjected to hydrolysis, the details of which are given below in respect of the reactions (4) and (4'), with a view to obtaining a diacid or an amino acid.

A variant, of which the purpose is to obtain a diamine, consists in treating the nitroketoxime originating from reaction (2) with an acid having a dehydrating character. It is thus possible to employ acids which are known for their dehydrating properties, such as $H_2SO_4$ or $H_3PO_4$ (possibly polyphosphoric acid), in concentrations of at least 10 N. In particular, sulphuric acid is suitable at concentrations exceeding 60% $H_2SO_4$ by weight, and preferably between 65% and 80%. This leads to the formation of furoxane. The reaction is:

(3')

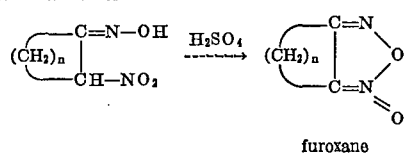

furoxane

The hydrogenation of furoxane gives the diamine $NH_2$—$(CH_2)_n$—$NH_2$. The conversion of the furoxane of cyclohexane to hexamethylene diamine is known (Chem. Ber. 90, pages 2124–2137 (1957)).

The alpha-nitroketone, obtained by the reaction (3), hydrolysed in alkali medium, leads to an aliphatic acid carrying a nitro group in the omega position. The hydrolysis can be effected in accordance with the procedure described in Belgian Patent No. 704,894 or in the article of J. Org. Chem. 1995-6 of 1967. Thus, for example, in the case of alpha-nitrocyclodecanone, hydrolysis in 4% sodium hydroxide solution, followed by acidification, gives the omega-nitrododecylic acid with a quantitative yield:

(4)

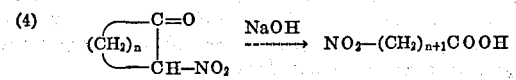

In the variant of the invention, in which it is the object to prepare the corresponding diacid, the nitroketone is subjected to hydrolysis in acid medium, which gives:

(4')

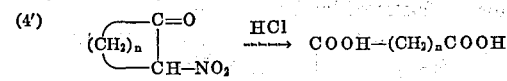

The most important embodiment of the invention, which is that leading to an omega-aminocarboxylic acid as final product, comprises hydrogenation of the nitro derivative obtained according to reaction (4). This hydrogenation can be effected by the conventional method, described in J. Org. Chem., page 1226, June 1967. A quantitative yield is obtained, for example, in the preparation of the omega-amino-dodecylic acid, by hydrogenation of the omega-nitro-dodecylic acid in alcoholic medium and at 20° C., in the presence of a conventional hydrogenation catalyst.

The invention is illustrated by the non-limiting examples which follow.

EXAMPLE 1

Manufacture of cyclododecane pseudo-nitrosite

A gaseous mixture of nitric oxide NO (6 litres per hour) and air (6 l./h.), is caused to enter a solution of 200 g. of cyclododecene in 1 litre of isooctane. After a few minutes, white crystals of pseudo-nitrosite appear and the solution turns green. The temperature is raised and then it is kept at the region of 30° C., while continuing to cause the passage of the gases.

The operation is continued until the conversion of the cyclododecane is complete. At different times during the preparation, the total weight $\phi$ in grams of formed pseudo-nitrosite is noted, the percentage conversion of the cyclododecene being used is calculated and also the $\phi$ yield of pseudo-nitrosite relatively to the cyclododecene having reacted is calculated.

| | $\varphi$, grams | Conv., percent | $\varphi$ yield, percent |
|---|---|---|---|
| Minutes: | | | |
| 131 | 40.2 | 23 | 69.0 |
| 265 | 102.0 | 52 | 76.0 |
| 325 | 118.9 | 64 | 72.5 |
| 480 | 136.8 | 94 | 56.5 |
| 510 | 140.1 | 100 | 53.0 |

It can be seen that the maximum yield of pseudo-nitrosite corresponds to a cyclododecene conversion rate of 52%; it is thus preferable to separate the formed pseudo-nitrosite when the 50% conversion has been approximately reached.

The separation of the unconverted cyclododecene and of the nitration oils is effected by extraction, with a mixture of petroleum ether and dimethyl formamide in equal volumes.

The pseudo-nitrosite of the cyclododecane, thus obtained for the first time, has a melting point of 210° C.

EXAMPLE 2

Preparation of the cyclododecano-furoxane (reaction 3')

In a 1-litre, three-necked flask, 65 g. of 2-nitrocyclododecanone-oxime are mixed with 300 ml. of 70% sulphuric acid. The mixture is introduced into a bath maintained at 110° C.; when the temperature has reached 100° C., this value is maintained for 15 minutes. The contents of the flask are then cooled and poured on to ice; the crystals are hydro-extracted and they are washed 3 times with water, whereafter they are recrystallised from acetonitrile with animal charcoal.

In this way, 57.6 g. of cyclododecano-furoxane are obtained, which melts at 78° C. From the concentrated mother liquors, another 5 g. of the same product are recrystallised, bringing the yield to 78%.

This product is a novel chemical compound.

EXAMPLE 3

Hydrogenation of the cyclododecano-furoxane 250 ml. of anhydrous tetrahydrofuran are introduced into a 1-litre, three-necked flask, flushed with nitrogen, followed by 11 g. of $LiAlH_4$ in fractions. A solution of 4.5 g. of cyclododecano-furoxane in 50 ml. of anhydrous tetrahydrofuran is then introduced dropwise in 20 minutes. The mixture is heated under reflux for 5 hours, after which it is cooled and slowly poured into a normal sodium hydroxide solution, resulting in a white suspension which is left to stand.

The formed precipitate is hydro-extracted and carefully washed with tetrahydrofuran; the vapor phase is evaporated to dryness, leaving 4 g. of 1,2-diaminododecane, melting at 60° C.; and this represents a quantitative yield.

EXAMPLE 4

52 g. of 1-nitroso-2-nitro-cyclododecane dimer, that is to say, cyclododecene pseudo-nitrosite, are dispersed in 120 g. of dimethyl formamide, and the suspension is heated for 17 minutes at 120° C. The solution thus obtained is poured into 500 ml. of water: the two phases which are present, an organic phase and aqueous phase, are treated with ether; the ether is then driven off from its two combined solutions, which leaves 50.3 g. of 2-nitro-cyclododecane-oxime (a yield of 97%).

50 g. of the oxime are dissolved in 1250 ml. of acetone and 1250 ml. of normal aqueous hydrochloric acid are added to the solution which is obtained. The mixture is heated under reflux for 6 hours at 60° C., after which the acetone is driven off and the residue is extracted with ether, and thereafter washed 3 times with water. The ethereal solution is dried over anhydrous magnesium sulphate, filtered and the ether is evaporated. The oily residue which remains is dissolved in a minimum of boiling methanol; after cooling the methanolic solution, the formed crystalline paste is hydro-extracted over sintered glass and the crystals are washed with cold methanol.

In this way, 32.8 g. 2-nitro-cyclododecanone, melting at 76° C. are obtained. The conversion rate of the initial ketoxime into the final product is thus shown to be 70.8%; however, since 7.4 g. of unconverted 2-nitro-cyclododecanoxime are left and this residue is recovered, the 2-nitro-cyclododecanone yield is 83%. The aqueous liquid is evaporated to dryness; after heating in ethanol and cooling, 7.6 g. of hydroxylamine hydrochloride are recovered, that is to say, a yield of 60% on the initial nitroxime.

EXAMPLE 5

50 g. of bis-1-nitroso-2-nitrocyclohexane are suspended in 1100 ml. of dimethyl sulphoxide and kept at 118° C. for 20 minutes. 1 litre of a normal solution of HCl and 500 ml. of butanone are added, and the temperature is adjusted to 75° C. After 4 hours at 75° C., the solution is subjected to vacuum distillation in the region of 50° C. until the major part of free HCl and water is eliminated. The remaining solution is neutralised; it contains hydroxylamine hydrochloride and 36 g. of 2-nitro-cyclohexanone. This example shows that the two steps of the process according to the invention may possibly be carried out in the same medium, without previous separation of the nitro-ketoxime.

EXAMPLE 6

Preparation of 12-nitro-dodecanoic acid (reaction 4)

A solution of 200 ml. of normal sodium hydroxide solution, to which have been added 45.4 g. of 2-nitro-cyclododecanone prepared according to Example 4, is heated under reflux at 100° C. for 1 hour. After 15 minutes, the nitroketone is completely dissolved.

After cooling the solution, it is filtered and and the filtrate is acidified with concentrated hydrochloric acid to the formation of a precipitate which is hydro-extracted and washed. In this way, there are obtained 48 g. of 12-nitro-dodecanoic acid, melting at 58° C.; the yield is 98%.

EXAMPLE 7

Hydrogenation of the 12-nitro-dodecanoic acid 20 g. of 12-nitro-dodecanoic acid and 5 g. of active carbon charged with 5% of palladium are introduced into 20 ml. of glacial acetic acid. The mixture is heated to 60° C. and hydrogen is introduced thereinto, this being very quickly absorbed within 1¼ hours. The catalyst is separated by filtration, and the liquid is evaporated to dryness. The dry residue is taken up in a solution of 500 ml. of water and ammonia to a pH value of 8. The precipitate is hydro-extracted, whereupon it is washed and dried, giving 15.5 g. of 12-amino-dodecanoic acid, melting at 183° C.; the yield is found to be 88.5%.

The same operations are repeated, but the hydrogenation is carried out under a hydrogen pressure of 15 atm.

In this case, 16.8 g. of 12-amino-dodecanoic acid are obtained, i.e. a yield of 96%.

EXAMPLE 8

Preparation of 6-amino-hexanoic acid (amino-caproic acid)

The 2-nitro-cyclohexanone prepared according to Example 5 and extracted from the solution in accordance with the procedure of Example 4, is first transformed into 6-nitro-hexanoic acid by heating at 100° C. in a 4% caustic potash solution, followed by precipitation with concentrated hydrochloric acid as in Example 6.

By applying the hydrogenation process, described in Example 7, the 6-nitro-hexanoic acid is transformed into 6-amino-hexanoic acid, with a yield of 97%.

EXAMPLE 9

Preparation of adipic acid 2-nitro-cyclohexanone is subjected to acid hydrolysis in a 10% HCl solution at boiling point, instead of the alkali hydrolysis of Example 8. Hexanedioic (adipic) acid is obtained with a yield of 92%.

EXAMPLE 10

Preparation of 1,6-diamino-hexane

In the manner described in Examples 2 and 3, 100 g. of 2-nitro-hexanone-oxime are subjected to dehydration with lithium and aluminum hydride, into 1,6-diamino-furoxane is obtained. This latter is then hydrogenated, witth lithium and aluminum hydride, into 1,6-diamino-hexane.

EXAMPLE 11

The operations of Examples 1,2,3,4,6 and 7 are repeated with cyclo-octane pseudo-nitrosite instead of the cyclododecane pseudo-nitrosite as starting material. In these operations, 8-amino-octanoic (8-amino-caprylic) acid, suberic (octanedioic) acid and 1,8-diamino-octane are obtained with practically the same yields.

What is claimed is:

1. In a process for the synthesis of omega-aminocarboxylic acids of the formula:

$$H_2N—(CH_2)_{n+1}—COOH$$

wherein $n$ is an integer of from 4 to 30, comprising:
(a) obtaining a dimer pseudonitrosite of the formula:

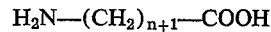

by reacting, in a solvent, nitrogen oxide with an unsaturated cycloaliphatic hydrocarbon of the formula

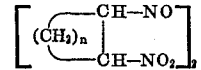

(b) isomerizing said recovered pseudonitrosite into the the corresponding nitroketoxime of the formula

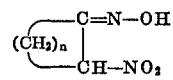

(c) contacting said nitroketoxime with an acid to form an alpha-nitroketone of the formula

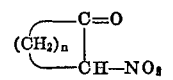

(d) hydrolyzing in an alkali medium said ketone into nitroacid of the formula $$NO_2-(CH_2)_{n+1}-COOH$$

and (e) hydrogenating said nitroacid into the desired omega-aminocarboxylic acid;

the improvement comprising recovering the nitrosite of Step (a) at a point when not more than about half of the hydrocarbon has been converted to said pseudonitrosite.

2. The process of claim 1 wherein $n$ is from 5 to 18.

3. The process of claim 1 wherein the unsaturated cycloaliphatic hydrocarbon is selected from the group consisting of cyclohexene, cyclooctene, cyclooctadiene, and cyclododecene.

4. The process of claim 1 wherein the solvent is a paraffinic or cycloparaffinic hydrocarbon having at least 8 carbon atoms.

5. The process of claim 1 wherein the acid is hydrochloric acid.

6. The process of claim 1 wherein the unsaturated cycloaliphatic hydrocarbon is cyclododecene, the pseudonitrosite is recovered when about half of the cyclododecene has been nitro-nitrosated, the acid is hydrochloric acid and the alkali medium is sodium hydroxide.

References Cited

UNITED STATES PATENTS

| 2,867,669 | 1/1959 | Burkhard et al. | 260—644 |

FOREIGN PATENTS

| 1,236,490 | 3/1967 | Germany | 260—644 |
| 1,238,461 | 4/1967 | Germany | 260—644 |
| 608,758 | 9/1948 | Great Britain | 260—644 |

OTHER REFERENCES

Smith, "The Chemistry of Open-chain Org. Cmpds.," vol. II (1966).

W. A. Benjamin, Inc., New York, p. 39 (1966).

Matlack et al., Cleavage of 2-Nitrocyclohexanone by Base" (1966), J. Org. Chem., 32, pp. 1995–96 (1967).

GLENNON H. HOLLRAH, Primary Examiner

U.S. Cl. X.R.

260—307 R, 533 C, 534 R, 537 R, 566 A, 583 P, 586 R, 644